United States Patent
Snyder et al.

(10) Patent No.: US 8,313,378 B1
(45) Date of Patent: Nov. 20, 2012

(54) YOGA BALL GAME CONTROLLER SYSTEM AND METHOD

(75) Inventors: Seth Snyder, Providence, RI (US); Jasper Speicher, Oakland, CA (US)

(73) Assignee: Humana Inc., Louisville, KY (US)

(*) Notice: Subject to any disclaimer, the term of this patent is extended or adjusted under 35 U.S.C. 154(b) by 83 days.

(21) Appl. No.: 12/841,630

(22) Filed: Jul. 22, 2010

Related U.S. Application Data

(60) Provisional application No. 61/227,857, filed on Jul. 23, 2009.

(51) Int. Cl.
*A63F 13/00* (2006.01)
(52) U.S. Cl. .................. 463/36; 463/37; 463/39
(58) Field of Classification Search .......... 463/36, 463/37, 39
See application file for complete search history.

(56) References Cited

U.S. PATENT DOCUMENTS

| | | | | |
|---|---|---|---|---|
| 4,817,950 A * | 4/1989 | Goo | ............... | 463/36 |
| 5,613,690 A * | 3/1997 | McShane et al. | ............. | 273/449 |
| 5,913,727 A * | 6/1999 | Ahdoot | ............... | 463/39 |
| 6,225,977 B1 * | 5/2001 | Li | ............... | 345/156 |
| 2005/0076161 A1* | 4/2005 | Albanna et al. | ............... | 710/15 |
| 2010/0009762 A1* | 1/2010 | Takeda et al. | ............... | 463/47 |

FOREIGN PATENT DOCUMENTS
EP 2080538 A1 7/2009
* cited by examiner

*Primary Examiner* — James S McClellan
(74) *Attorney, Agent, or Firm* — Standley Law Group LLP

(57) ABSTRACT

A yoga ball controller communicates motion signals to a game console and a video game executing on the game console to progress play of a game in response to the motion signals. An individual positions himself on the yoga ball and begins to move his body. The controller detects the motion of the individual and communicates signals to the console. The game console recognizes the motion and advances the game play. Motion may be detected using various devices such as a stress ball, a motion sensing mat, and a controller attached to the yoga ball using a harness. The video game may be a well-known, entertaining video game such as one involving car racing, combat, exploration, or puzzle solving. By using a subject other than exercise, game play may be seen as more fun by participants thereby encouraging physical activity.

19 Claims, 10 Drawing Sheets

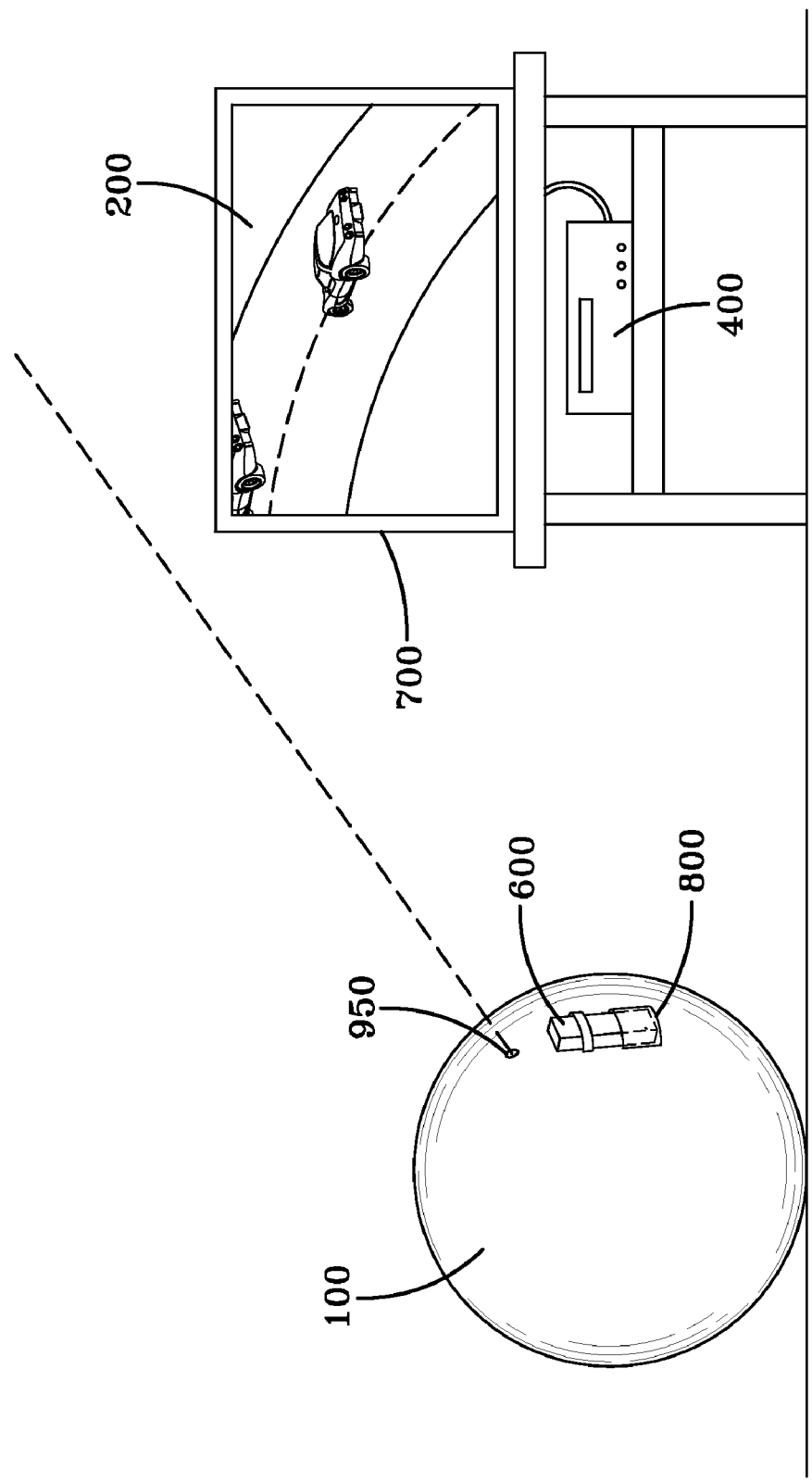

YOGA BALL GAME CONTROLLER SYSTEM AND METHOD

CROSS REFERENCES TO RELATED APPLICATIONS

This application claims priority to U.S. Provisional Application Ser. No. 61/227,857 filed on Jul. 23, 2009, the content of which is incorporated by reference as if fully recited herein.

FIELD OF THE INVENTION

The present invention relates to gaming systems. In particular, exemplary embodiments relate to a system and method of playing and progressing through a video game by utilizing a yoga ball.

BACKGROUND AND SUMMARY OF THE INVENTION

Maintaining a healthy lifestyle is important for numerous reasons. First, it can have a strong impact on the quality of a person's life. People who are healthy tend to be happier, and more successful in day-to-day endeavors. Furthermore, as the life span of individuals continues to grow, leading a healthy life increases the odds that the later years of life are enjoyable. Second, maintaining a healthy lifestyle can have an impact on the costs of health care. Individuals who are healthy tend to require less medication, fewer treatments for ailments, less hospital time, etc.

Unfortunately, there are many existing factors that encourage individuals to lead an unhealthy lifestyle. The increasing convenience of many technologies has caused people to be more sedentary than ever before. Teens and adults in particular are spending more and more time in front of televisions and computers and less and less time partaking in healthy activities such as physical exercise. In particular, many individuals are choosing to spend their time playing video games that do not require much physical movement rather than getting involved in sports or games that require the exertion of significant physical energy. While some video gaming systems have created fitness programs, these fitness programs do not typically incorporate a game. Furthermore, because most video gaming systems are connected to a television or incorporated into a computer (desktop or laptop) the amount of physical activity that can be performed while playing the game is limited. One of the best ways to become and stay fit is to exercise the body's core muscles. One means of exercising the core muscles of the body is through yoga. Unfortunately the idea of performing yoga is unpleasant to many for a variety of reasons.

There is a need in the art for a game that incorporates meaningful physical activity. In particular, there is a need for a game which requires players to perform yoga or yoga-type moves to progress through the game thereby causing the individual to exercise his or her core muscles. In one exemplary embodiment, a classic video game is played with at least one yoga ball. In a preferred exemplary embodiment, the player sits atop of the yoga ball and moves his or her body—and hence also causes the yoga ball to move—in order to cause progression in the video game. The yoga ball may be connected to a known game controller which communicates the yoga ball's motion to a game console. In another exemplary embodiment, the yoga ball is positioned on or within a motion sensor which is in communication with a game console. In some exemplary embodiments, a yoga ball comprises at least one sensor in connectivity with a game console where the sensor measures the movement of the yoga ball in at least one direction so that the measurement can be sent to the game console. In one exemplary embodiment two yoga balls are utilized by a player to advance through a video game.

A preferred exemplary embodiment comprises a yoga ball, a game console, a video game executing on the game console, and a controller that corresponds to the console such that motion of the controller can be detected by the console. In such an embodiment, an individual may position himself on the yoga ball while holding the controller and begin to move his body. Alternatively, the controller may be connected to the yoga ball in some embodiments. The game console may detect the motion of the controller as it moves with the individual. In response to the recognized motion, the game console may advance the individual through the video game. In preferred exemplary embodiments, certain moves of the controller that are recognized by the game console will correspond to certain video game effects.

Some exemplary embodiments comprise a yoga ball and a stress ball. In a preferred exemplary embodiment the player sits upon the yoga ball and holds the stress ball in at least one hand. The yoga ball and the stress ball may both be adapted to sense the movement of the player's body and cause a message or messages to be sent to a game console in response to the movement. In a preferred exemplary embodiment, the system comprises a signal translating device which receives messages from at least one yoga ball where the messages contain information regarding the movement of a player's body and translates those messages into signals to be sent to a game console. Preferably, the translated messages correspond to signals the game console would receive from a traditional video game controller. In these exemplary embodiments, when the signal translating device is in connectivity with a game console, at least one yoga ball may be utilized to replace a traditional controller that corresponds to the game console for playing a video game on the console.

In one exemplary embodiment, a yoga ball is utilized to play a video game, the subject of which is not exercise. In other words, the game player exercises with the yoga ball to play a game but the game is about something other than exercise. For example, the video game may be one involving car racing, combat, exploration, puzzle solving, etc. By having a subject other than exercise, game play may be seen as more fun by participants thereby encouraging physical activity.

BRIEF DESCRIPTION OF THE DRAWINGS

A better understanding of the disclosed embodiments will be obtained from a reading of the following detailed description and the accompanying drawings wherein identical reference characters refer to identical parts and in which:

FIG. 8 shows an exemplary embodiment of a yoga ball comprising a light that may be projected onto a surface such as a wall and the yoga ball is being utilized to play a video game.

DETAILED DESCRIPTION

Figure 1:
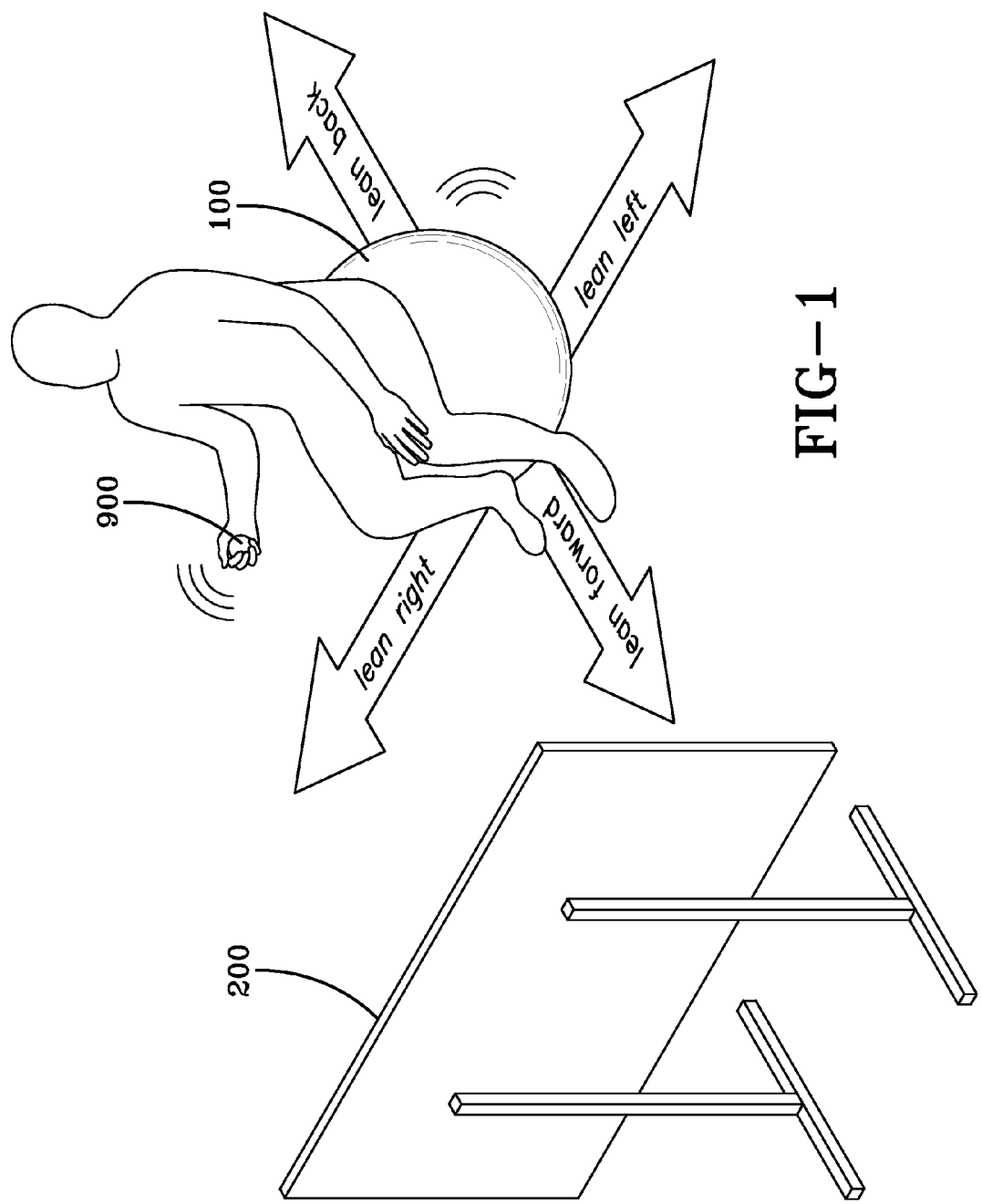
FIG. 1 shows an exemplary embodiment of an individual player utilizing an exemplary yoga ball game system.

In one exemplary embodiment, the system comprises a yoga ball and a game console. The yoga ball may measure the motions of an individual using the ball to play a video game and then cause a signal to be sent to the game console. The game console is preferably in connectivity with a monitor where the monitor displays the player's progress in the video game. Game consoles that may be utilized include Xbox®, Xbox 360®, Nintendo®, Nintendo Wii®, PlayStation®, etc. In a preferred exemplary embodiment, as shown in FIG. 1, a game player may sit atop a yoga ball 100 and move his or her body in order to progress through a video game 200. In some exemplary embodiments, the yoga ball is able to detect movement in 360 degrees. In other words, a player sitting on top of the yoga ball may be able to progress through a game by moving his or her body in such a way that the yoga ball is caused to move, forwards, backwards, to the left and right, and every direction in between. In some embodiments, the yoga ball may measure movement in a smaller range. When a yoga ball measures motion in a smaller range, it may encourage a player to move in a specific way which is better for strengthening his or her core muscles.

Figure 2:
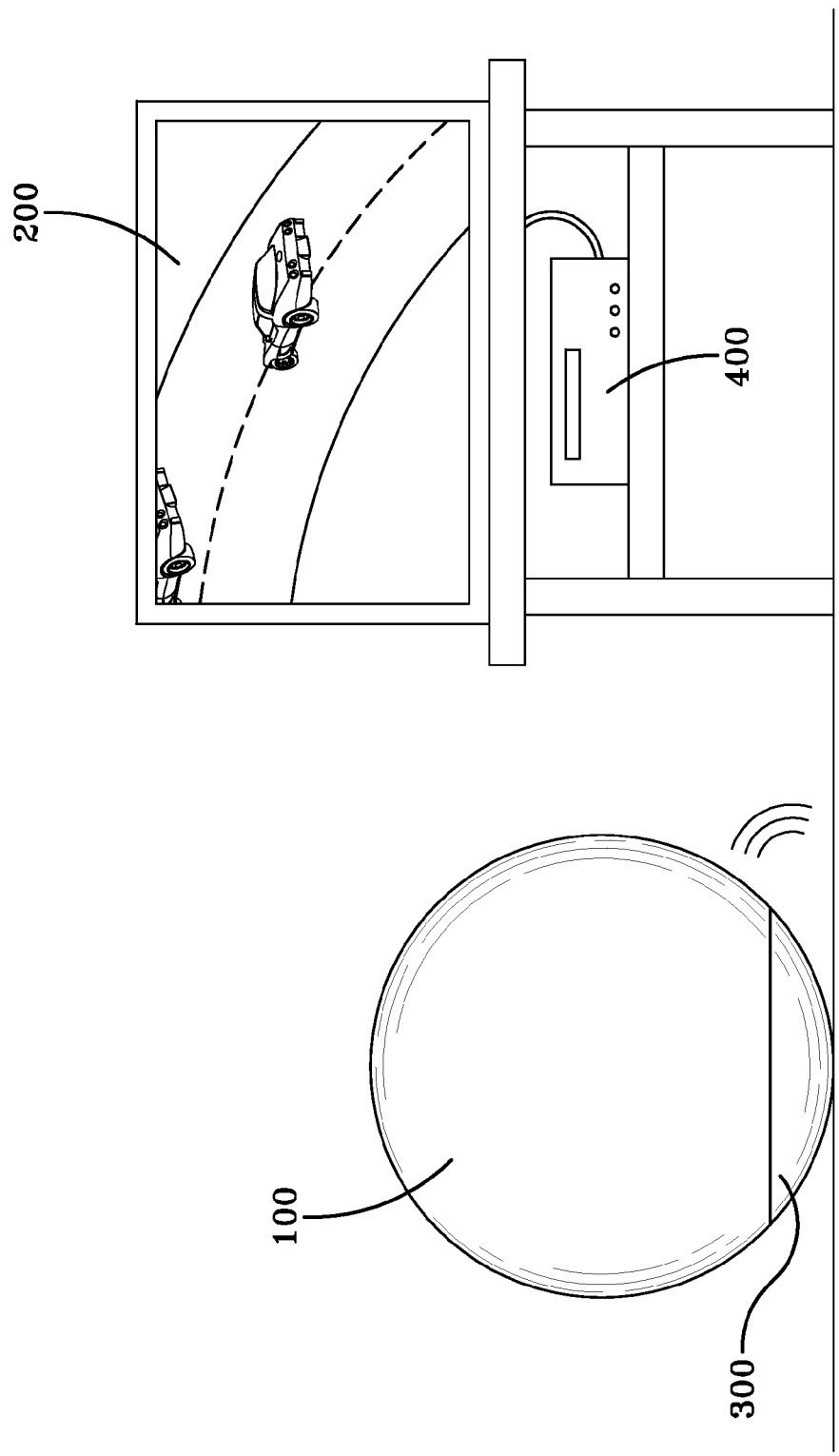
FIG. 2 shows an exemplary embodiment of a yoga ball comprising a motion sensor that is in communication with a game console.

In one exemplary embodiment a yoga ball comprises a motion sensor that enables the measurement of motion where the motion sensor is in communication with a game console or other device executing a video game 200. In one exemplary embodiment as shown in FIG. 2, a motion sensor 300 is located on a portion of the yoga ball 100 that comes in and out of contact with the ground when the yoga ball 100 is being utilized by an individual playing a video game 200. As shown in FIG. 2 the motion sensor 300 may send motion data to a game console 400 that is executing the video game 200. In this exemplary embodiment the player's progression through a game may be determined by the sensor's ground-contact position. In another exemplary embodiment, a motion sensor 300 may detect when it has been partially moved in or out of contact with the ground or similar surface and may utilize the motion measurement to progress a player through a game 200. Some exemplary embodiments comprise a yoga ball 100 with a plurality of motion sensors 300 that come in and out of contact with the ground when the yoga ball is being utilized by an individual playing a video game. In these exemplary embodiments, a player's progression through a game 200 may be determined by the time period in between the one or more sensors 300 being placed in a ground-contact position. The sensors may also utilize measurements relating to when they have been taken out of contact with the ground or similar surface. In some exemplary embodiments, a yoga ball 100 comprising at least one motion sensor 300 is utilized in conjunction with a special surface that facilitates the motion sensor's use.

In some exemplary embodiments, a yoga ball 100 comprising a motion sensor 300 is utilized such that a player sitting on top of the yoga ball 100 is in contact with a motion sensor 300. When an individual is in contact with a motion sensor 300, the motion sensor 300 may be able to measure when the individual is no longer in contact with the motion sensor 300 or when the individual's position on the motion sensor 300 changes. When an individual's motion is detected by a yoga ball's motion sensor 300 the motion sensor 300 may cause a signal to be sent to a game console 400 causing a player's progression in a game 200. A motion sensor 300 may measure the direction of a player's motion as well as the player's speed of movement.

In some exemplary embodiments a yoga ball 100 may comprise at least one motion sensor 300 which is to be selectively contacted by a player in order to progress through a video game 200. In these exemplary embodiments, the player may be required to touch the sensor 300 with a portion of his or her body in order to obtain a desired game result. In some exemplary embodiments, the player may be required to contact the motion sensor 300 for a certain period of time in order to obtain a desired game result. In some exemplary embodiments, a yoga ball 100 comprises multiple motion sensors 300 that are to be selectively contacted by a player in order for the player to progress through a video game 200.

Figure 3:
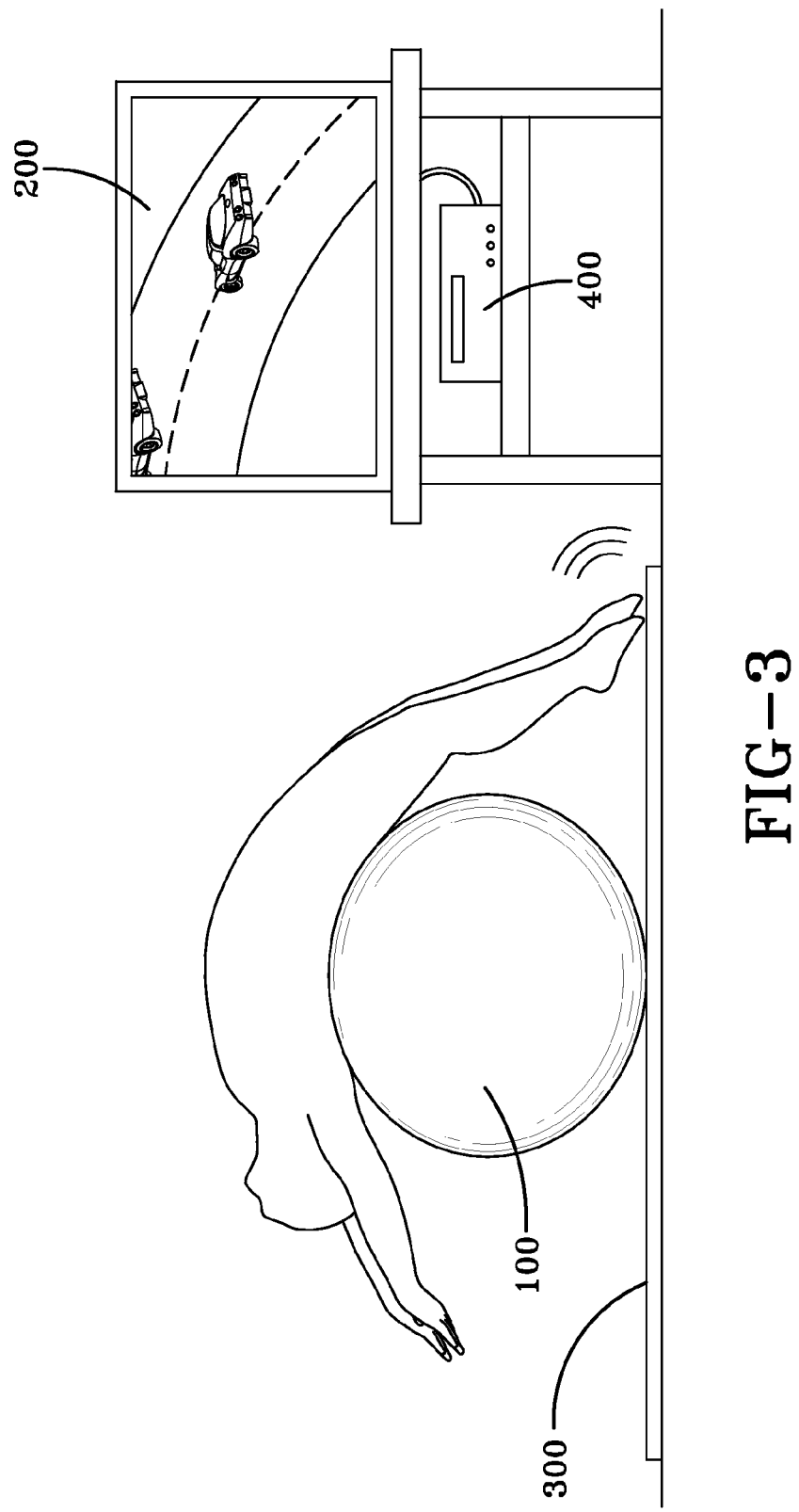
FIG. 3 shows an exemplary embodiment of a yoga ball being utilized in conjunction with a motion sensing mat to play a video game on a game console.

In one exemplary embodiment a yoga ball 100 is positioned upon a motion sensor 300. As shown in FIG. 3, the motion sensor may be a mat 310 that is capable of detecting changes in the yoga ball's position, the weight distribution of a player positioned on a yoga ball 100, etc. In exemplary embodiments comprising a motion sensing mat 310, a player utilizing a yoga ball to play a game may position the ball on top of the mat 310 and then sit on top of the ball 100. The player may first have to sit in a neutral position (for example, weight centered on top of the ball) so that the mat 310 can utilize the neutral position measurement to determine future movements throughout the course of game play. In other words, the mat 310 may utilize the difference between the neutral position and other measured positions of the yoga ball 100 to advance an individual in game play. In some embodiments, a player's movement in a single direction on top of the yoga ball 100 may have different effects in game play depending on the degree of the movement, speed of the movement, etc. In preferred exemplary embodiments, movement of a yoga ball 100 is measured in 360 degrees. In some exemplary embodiments, a mat 310 that detects the motion of a yoga ball 100 is also able to detect contact by a player positioned on top of the yoga ball. In some exemplary embodiments the player may selectively touch the mat 310 as well as cause motion of the yoga ball 100 both of which can be measured by the mat 310 to cause the player's progression through a video game 200. In other exemplary embodiments, a yoga ball 100 is positioned within or near a device that measures the movement of the ball. The ball may be coated (partially or fully) with a material that may be detected by the movement measuring device. In one exemplary embodiment a mat 310 utilizes infra red technology to determine the orientation of a yoga ball positioned on it. In another exemplary embodiment, the yoga ball comprises infra red technology to measure it's orientation in relationship to the mat 310.

Figure 4:
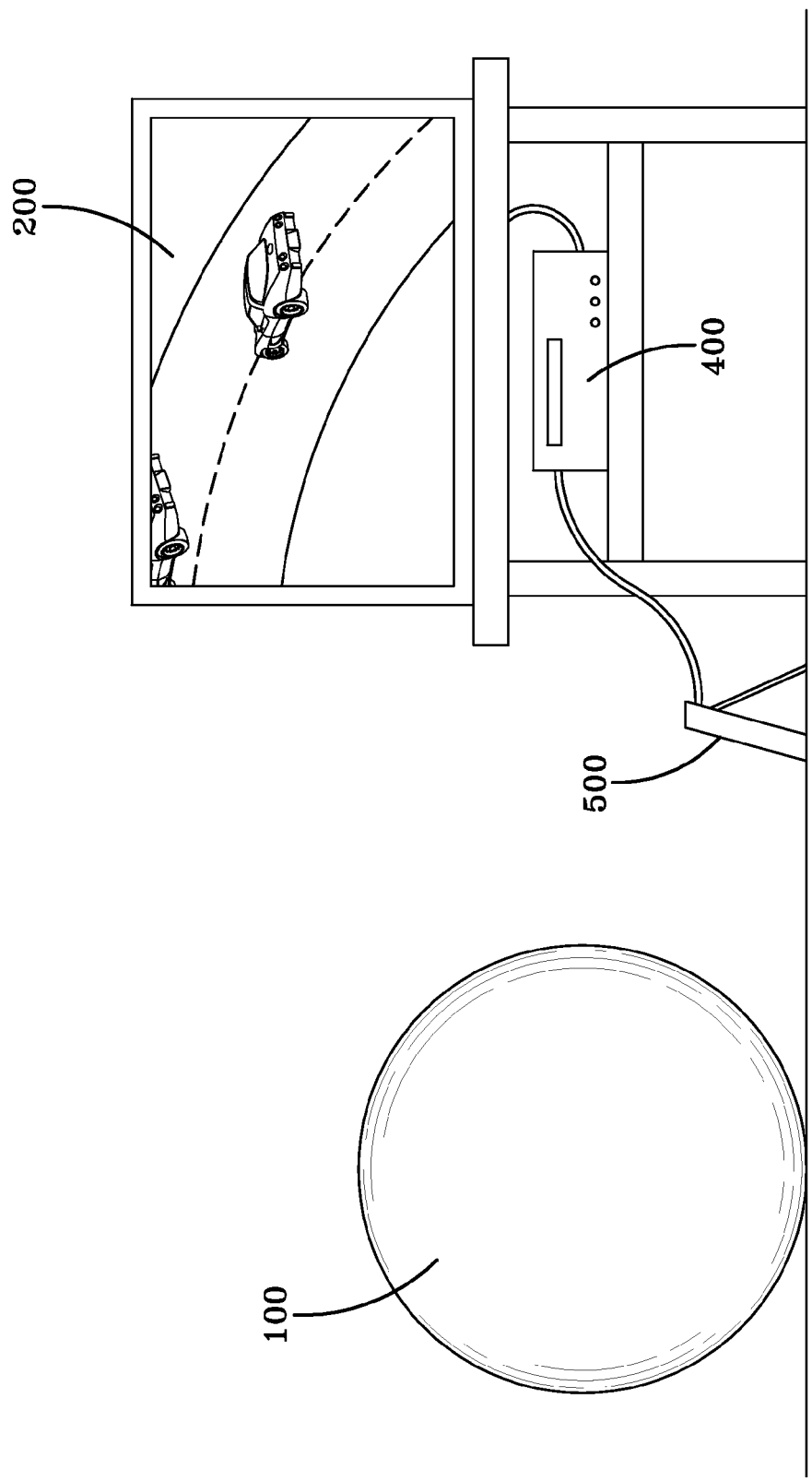
FIG. 4 shows an exemplary embodiment of a yoga ball and a motion detecting device that may be utilized to play a video game.

In some exemplary embodiments, a yoga ball 100 is utilized in conjunction with at least one movement measuring device 500 that is not connected to the yoga ball 100 where the device 500 measures the motion of an individual player in order to play and progress through a game. In one example as shown in FIG. 4, a movement measuring device 500 can be selectively contacted by the feet of an individual player and the device measures the contact of at least one of the player's feet. In such an example, the measuring device 500 may detect the presence of a signaling member that has been positioned on one of the player's feet. In some exemplary embodiments, the movement measuring device 500 is able to detect the body heat of an individual player and utilizes the detection to recognize when the player has come into contact with at least one of its surfaces.

Figure 5:
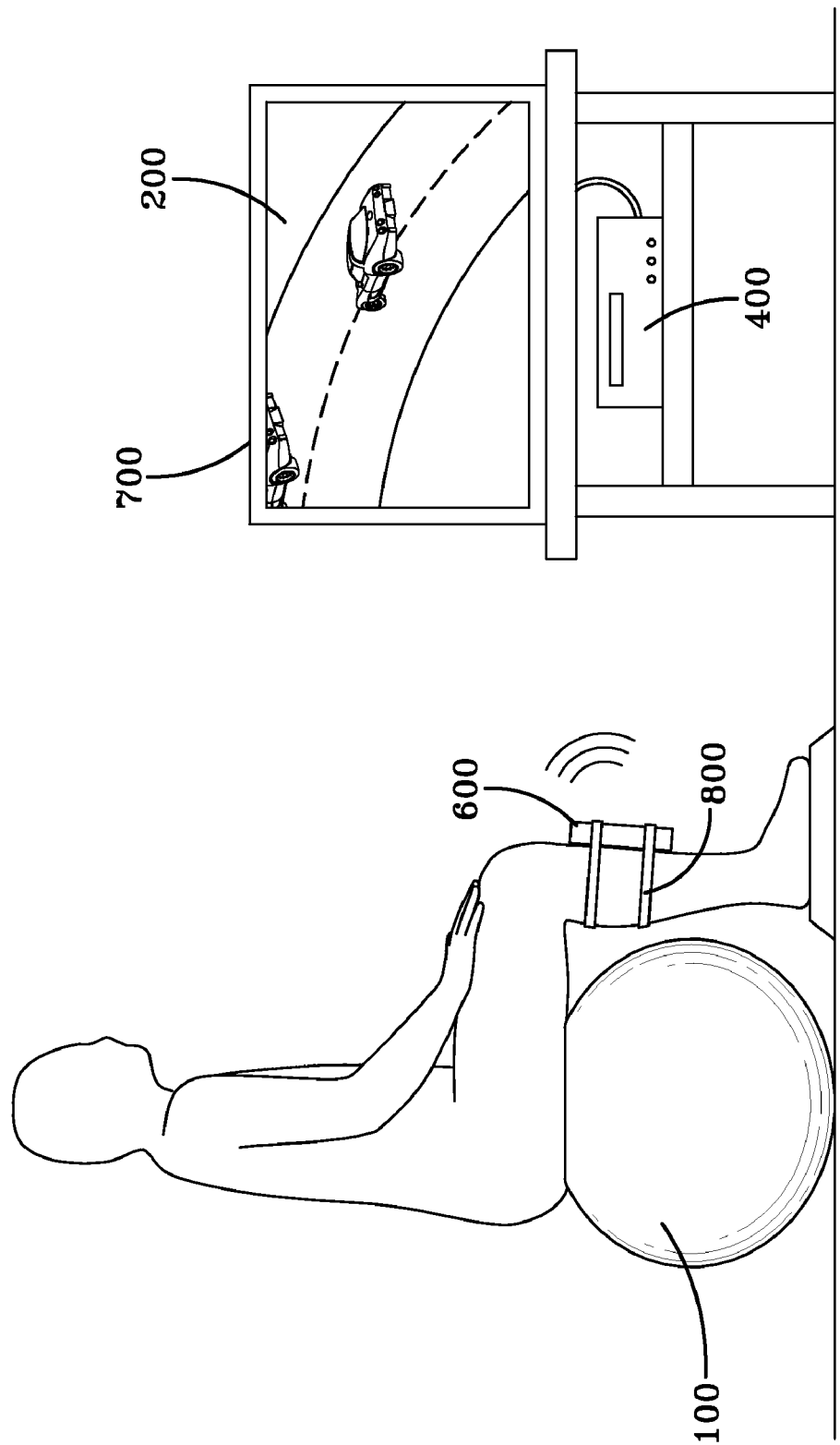
FIG. 5 shows an exemplary embodiment of an individual utilizing a yoga ball and a handheld controller to play a video game.
Figure 6:
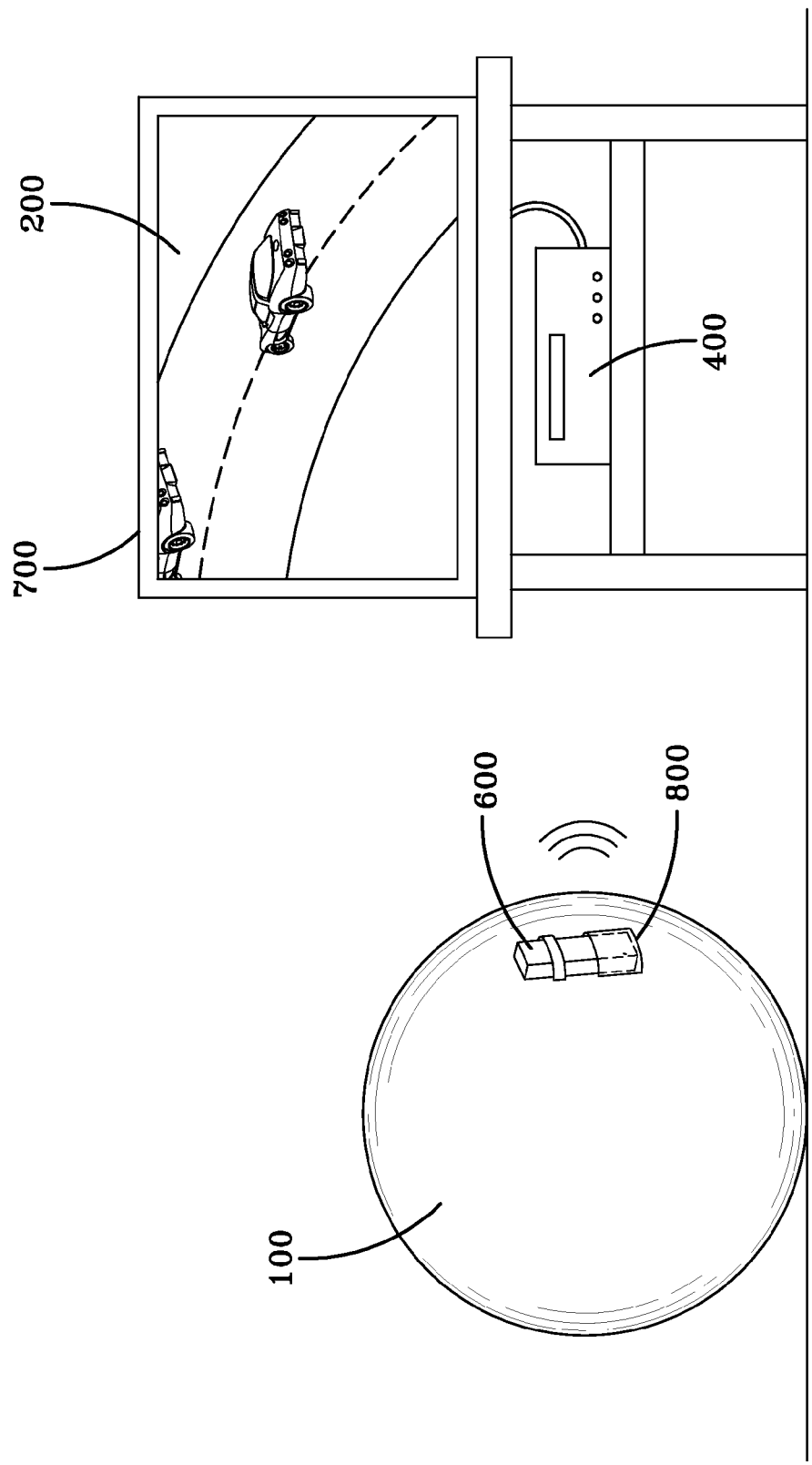
FIG. 6 shows an exemplary embodiment of a harness being utilized to hold a handheld controller to a yoga ball such that the yoga ball may be utilized to play a video game.

In one exemplary embodiment, the system comprises a yoga ball 100, a game console 400 comprising a microprocessor and a graphics system where the game console 400 is in communication with a display screen 700, a video game 200 executing on the console, and a handheld controller 600 comprising an accelerometer system that measures movement in three dimensions and where the controller is in communication with the game console 400. The controller 600 may be in communication with the console via a Bluetooth® connection. The controller 600 may comprise infra red technology in order to determine the controller's orientation in relationship to the display screen 700 or some other predefined object such as the console 400. In one exemplary embodiment the game console may comprise a Nintendo Wii and the controller comprise a Wii controller. The video game 200 executing on the game console 400 is preferably one whose subject is not directed towards exercising. In the FIG. 5 exemplary embodiment, the system further comprises a controller harness 800 that holds the controller in a desired position on the body of an individual player. In one exemplary embodiment, the harness 800 holds a handheld controller such that it is above the chest of an individual player. In another exemplary embodiment as shown in FIG. 6, comprising a harness 800 for a controller 600, the harness 800 is part of or connected to the yoga ball 100 such that the controller 600 may be held in a desired relationship to the ball 100. In an example embodiment, the harness allows access to the hardware interface on the controller. The harness may be fashioned to allow quick removal during use, or to replace batteries, and keep the ball cleanable and usable as a standard yoga ball. The harness may be designed to press a button on the controller to indicate to the game that the controller is in the harness.

In some exemplary embodiments the system comprises more than one handheld controller 600 that are utilized by an individual player positioned atop a yoga ball 100 playing a video game 200 by moving his or her body on the ball 100. The term handheld controller does not imply that the controller 600 must always be held in the hand of an individual player but rather indicates the size of the controller 600 is such that it could be comfortably held by an individual player in his or her hands.

In an exemplary embodiment comprising a yoga ball 100, a game console 400 in communication with a display 700, and a handheld controller 600 comprising an accelerometer system that measures movement in three dimensions and where the controller 600 is in communication with the game console 400, the game console 400 may receive motion data from the controller 600 as an individual sitting atop the yoga ball 100 performs physical activities with the yoga ball 100. In one exemplary embodiment, the controller 100 is positioned on the individual utilizing the yoga ball—for example, it may be held to the individual's wrist, leg, chest, etc. or it may be held in the individual's hand. In another exemplary embodiment, the controller 600 is placed in a harness 800 that is part of or connected to a yoga ball 100. When the individual moves atop the yoga ball 100, the controller 600 may be correspondingly moved which movement may then be detected by the accelerometer system of the controller 600. The controller 600 may further comprise infra red technology such that the controller's orientation in relationship to the display 700 may be determined as the controller 600 is moved as a result of an individual's physical activities utilizing the yoga ball 100. There may be numerous moves of the controller 600 that are detectable by the controller. Preferably, software executing on the game console 400 can distinguish between various moves of the controller 600 such that the individual utilizing the yoga ball 100 is encouraged to perform certain moves to achieve a desired result in a video game 200. In some exemplary embodiments software that can distinguish between moves of the controller 600 is part of a video game 200 executing on the game console 400. In distinguishing a controller move, the software may receive data from the game console 400 relating to a recent move of the controller 600 and may then compare the received data to at least two stored pieces of data where each piece of data corresponds to a controller move as well as to a video game effect. A video game effect is an action performed in a video game 200 when an individual playing the game has performed an act recognized by the game. When the software matches the received data to a stored piece of data, it may then cause the video game effect to occur which may advance the player in the video game 200. One of skill in the art would understand there are numerous ways to process sensor data signals to determine if they meet certain conditions. For example, a window of data over a specified time period may be compared to stored exemplar data windows. More advanced gesture tracking may use the data window technology. Signal thresholding may also be used to detect when a signal has entered or existed in a certain state. In one exemplary embodiment the accelerometer system of the controller 600 may measure motion in less than three directions.

Figure 7A:
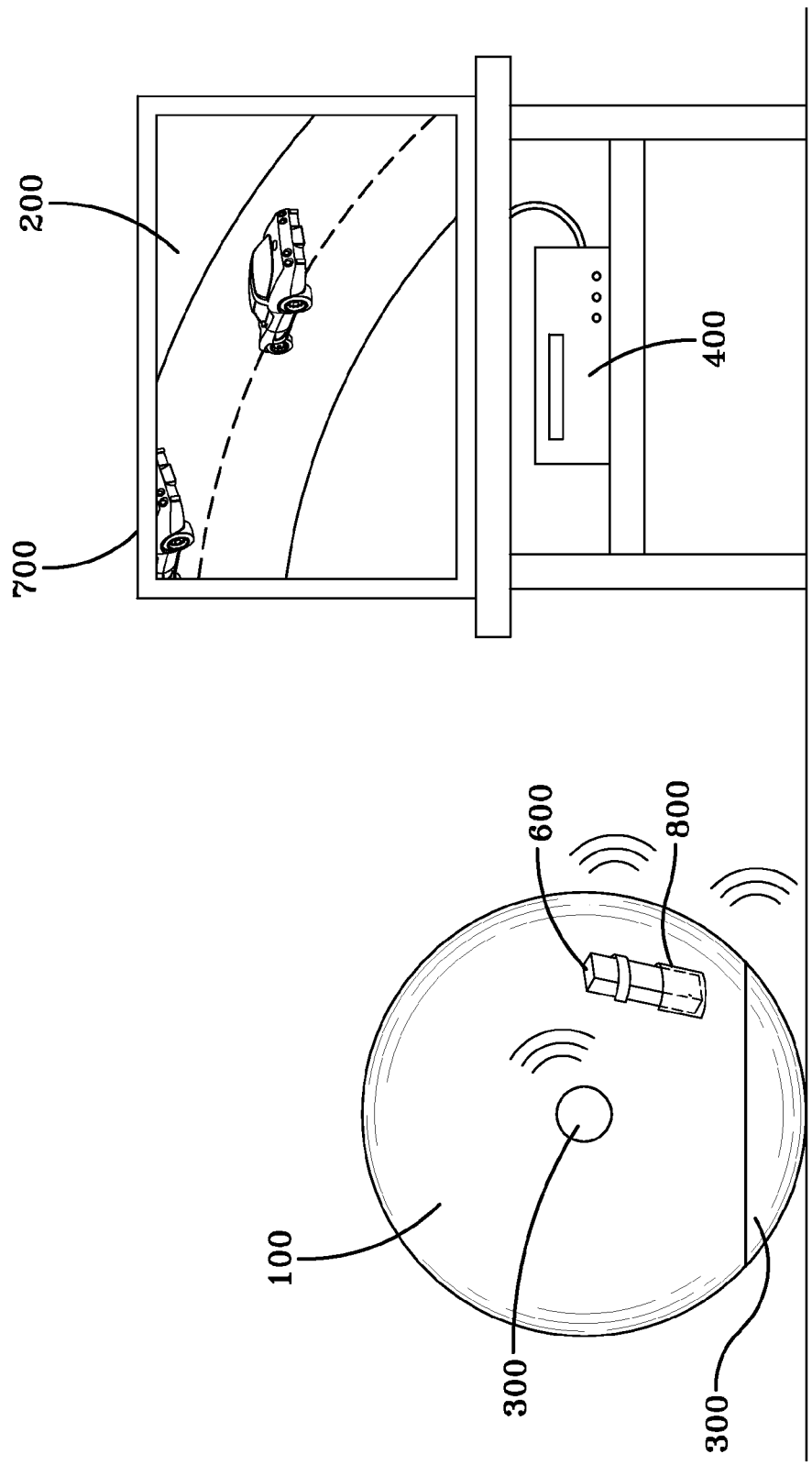
FIGS. 7A-B show an exemplary embodiment of a yoga ball comprising a motion sensor and a holster for holding a handheld controller where the motion sensor and the controller are in communication with a game console.
Figure 7B:
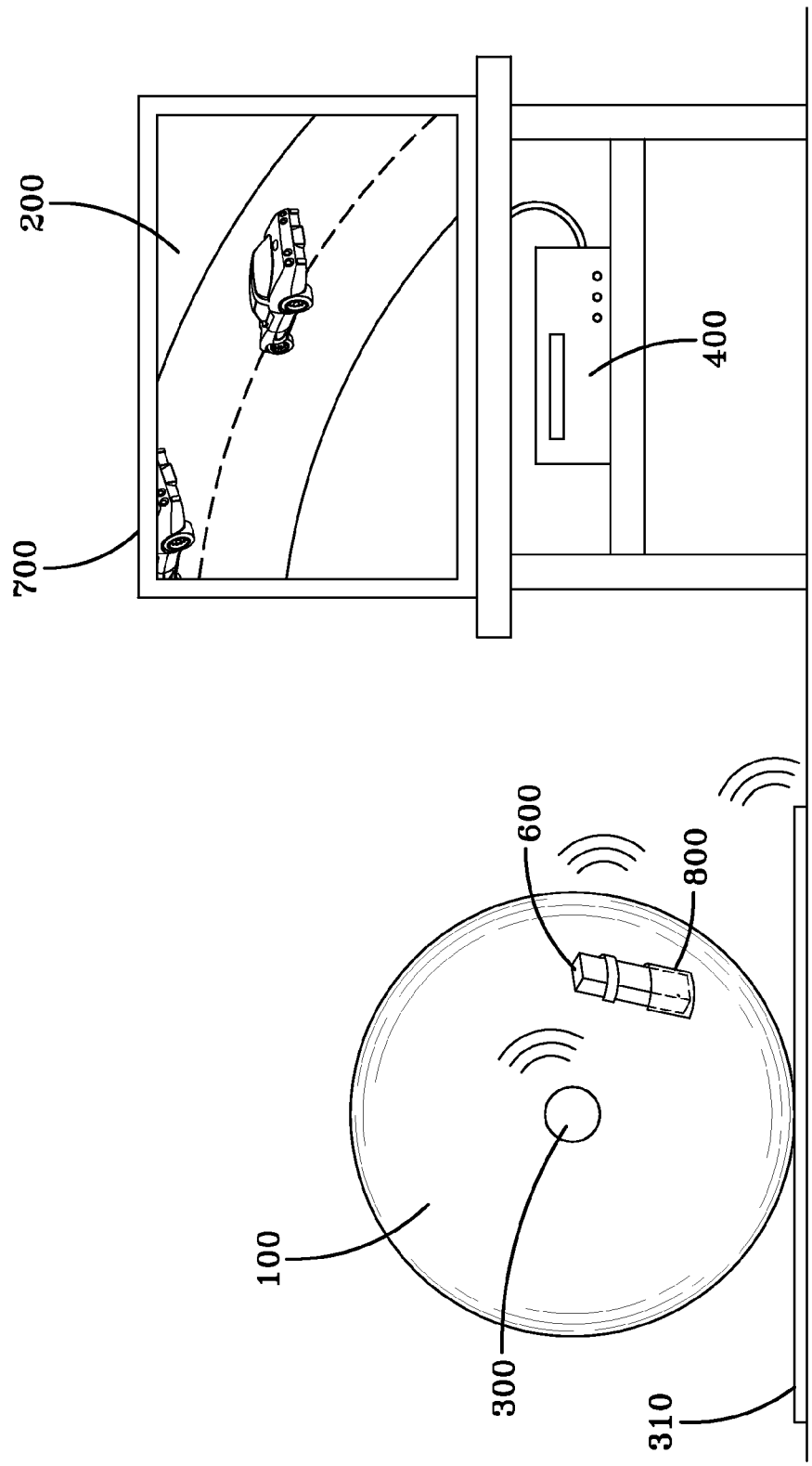

In one exemplary embodiment as shown in FIG. 7A, the system comprises a yoga ball 100, a game console 400, a video game 200 executing on the console 400, a handheld controller 600 comprising an accelerometer system that measures movement in three dimensions and where the controller 600 is in communication with the game console 400, and a motion sensor 300 in communication with the game console 400 where said motion sensor 300 is not located in or on the controller 600. In such an exemplary embodiment an individual may sit atop the yoga ball 100 and perform physical acts that cause the controller 600 to be moved and which may also be detected by the motion sensor 300. The console 400 may receive separate signals based on the movement of the controller 600 as well as the motion detected by the motion sensor 300. In one exemplary embodiment, each signal received causes a different video game effect. In one example, the motion sensor 300 may be located on the yoga ball 100. In another example as shown in FIG. 7B, the motion sensor may be part of a mat 310 located under or near the yoga ball such that it can detect when it has been touched by an individual utilizing the yoga ball 100 to play the video game. In an example comprising a mat 310 that comprises a motion sensor, the individual may be able to cause video game effects by selectively touching the mat 310 with his or her hands and feet. For example, an individual may be positioned such that his or her back is on the top of the yoga ball 100 and his or her feet as well as hands are in contact with the mat 310. The controller 600 may be attached to one of the individual's legs, arms, etc. The individual may be able to cause video game effects by moving his or her body on the yoga ball 100 such that the controller 600 is moved as well as by selectively moving his or her arms and legs off of the mat 310.

In an exemplary embodiment comprising a yoga ball 100, a game console 400, a video game 200 executing on the console 400, a handheld controller 600 comprising an accelerometer system that measures movement in three dimensions and where the controller 600 is in communication with the game console 400, and a motion sensor 300 in communication with the game console 400 where said motion sensor 300 is not located in or on the controller 600, the motion sensor 300 may communicate with the game console 400 in the same manner as the controller. The communication is preferably wireless. In some exemplary embodiments however at least the motion sensor 300 or the controller 600 stay in communication with the game console 400 via a wired connection. The yoga ball 100 may further comprise a harness 800 for holding the controller 600.

In one exemplary embodiment the system comprises a yoga ball 100, a game console 400, a video game 200 executing on the console 400, a handheld controller 600 that corresponds with the game console 400 such that its movement can be detected by the game console 400, and a stress ball 900 in communication with the game console 400. An exemplary embodiment of a stress ball is shown in FIG. 1. In a preferred exemplary embodiment, the stress ball 900 may be utilized by an individual playing a video game with a yoga ball to operate as a trigger or gear changer. In addition to the large ball with a controller on it, a user may interact with a smaller stress ball that sends controller data to the game when squeezed or otherwise manipulated by the user.

In one exemplary embodiment, software executing on a game console 400 or other device executing a video game, processes information received from a motion sensor 300 or handheld controller 600 to produce a video game effect. In a preferred exemplary embodiment, the software produces a desired video game effect when the information received indicates that an individual using a yoga ball 100 has performed a physical act designed to strengthen his or her core muscles. The software compares the accelerometer readings to a set of numeric thresholds that indicate how far the ball has tilted relative to gravity to determine the impact or magnitude of the user's action.

In one exemplary embodiment, the system comprises more than one yoga ball 100 where each yoga ball may be utilized by a separate player of a video game. In an exemplary embodiment comprising more than one yoga ball 100 where each ball 100 is being utilized by a separate player, each of the players may be positioned on his or her respective yoga ball 100 in such a way that moving his or her body in a manner which benefits healthiness and fitness. Those moves that benefit healthiness and fitness may be measured by a motion sensor mat 310 located beneath the yoga balls, other motion detecting device, motion of a handheld controller 600 attached to the yoga balls 100 or the players, etc. The measurements may then be utilized to progress the players that produced the motion through the game 200. In a preferred exemplary embodiment, when a system comprises more than one yoga ball 100 each being utilized by a separate player, the players compete against each other in the same video game by physically causing their respective yoga ball 100 to move.

In one exemplary embodiment comprising a yoga ball 100, the yoga ball 100 comprises at least one motion sensor 300 which detects the motion of at least one limb of an individual positioned on the yoga ball 100 and utilizing the yoga ball to play a video game. In one exemplary embodiment, the motion sensor 300 is able to detect the motion of an individual's arm or leg when the individual has placed a detectable band around that limb. In one exemplary embodiment an individual playing a video game with a yoga ball places a detectable band around each of his or her limbs. In the example, the yoga ball 100 may comprise at least one motion sensor 300 that is able to detect the motion of at least one of the bands. In one exemplary embodiment, the motion of each band worn by an individual can be detected by a motion sensor 300. In another example, the motion sensor 300 that can detect the motion of detectable bands worn by an individual utilizing a yoga ball 100 to play a video game is not part of the yoga ball 100.

In one exemplary embodiment comprising a yoga ball 100, the yoga ball 100 comprises multiple layers. In one embodiment comprising a yoga ball 100 with multiple layers, the multiple layers are not encompassing of the entire yoga ball 100 but rather encompass only a portion of the yoga ball 100 such that the multiple layers define an envelope for maintaining at least one motion sensor 300 and its componentry. A yoga ball 100 may be made from a polymeric material, such as PVC plastic, and may be inflated with air prior to being utilized by an individual to play a video game. In one exemplary embodiment where a yoga ball 100 is utilized in conjunction with a handheld controller 600, the yoga ball 100 comprises a harness 800 for holding the controller 600. In an exemplary embodiment comprising a harness 800, the harness 800 may be made primarily out of the same material utilized in forming the yoga ball 100. In another exemplary embodiment, the holster material may be made out of a material that is different from that utilized to make the yoga ball 100. A holster 800 for a handheld controller 600 may be made out of a fabric, polymer, etc. In one exemplary embodiment a holster 800 for a handheld controller 600 comprises a band that holds the controller 600 in a desired place in relationship to the yoga ball 100. A band may comprise elastic, a buckle, snaps, etc. to firmly hold the controller. In one exemplary embodiment where a yoga ball 100 has been placed in a position where it is touching the ground, a holster 800 for a handheld controller 600 may be positioned on a surface of the yoga ball 100 that will not come into contact with the ground while an individual is utilizing the yoga ball to play a video game.

In one exemplary embodiment, a yoga ball 100 being utilized to play a video game comprises at least one light 950. The light 950 may be a laser. In an exemplary embodiment, such as that shown in FIG. 8, where a yoga ball 100 comprises at least one light 950, the light may project from the yoga ball 100 on to another surface such as a wall. As a player utilizing the yoga ball 100 comprising a light 950 moves the yoga ball 100, the light may move from a first position on the surface onto which it is being projected to a second position on the surface thereby permitting the individual to gauge his or her motion. In one exemplary embodiment, a chart placed on the projection surface indicates where a player utilizing the yoga ball 100 to play a video game 200 should attempt to project the light 950 of the yoga ball and hence how the yoga ball 100 should be moved. The light 950 may be utilized as an initial training tool in some exemplary embodiments.

In some exemplary embodiments a computer is utilized in conjunction with a yoga ball 100 to play a video game 200. In these exemplary embodiments, the computer may be in connectivity with a monitor or display 700 for projecting a player's progress in a video game 200. Some exemplary embodiments comprise a yoga ball 100, a computer, a video game 200 executing on the computer, and a controller 600 that may be utilized with the computer such that the computer is capable of detecting the motion of the controller 600 within a certain distance range. In some exemplary embodiments, a computer may recognize the motion of a controller 600 because it is in communication with a device that senses the controller's motion and is capable of communicating with the computer.

In some exemplary embodiments, a yoga ball 100 may be utilized in conjunction with a handheld device where the handheld device operates as a game console and a monitor for displaying a video game. A handheld device may be a mobile gaming unit but it may also be a cell phone, laptop computer, etc. In some exemplary embodiments, a mobile device is held by an individual sitting on top of a yoga ball 100. As the individual moves his or her body, the mobile device may detect the motion and progress the individual through a game 200 executing on the device. The game 200 executing on the device may comprise software that has been downloaded onto the mobile device. In other exemplary embodiments the game 200 may be run on the mobile device once a game cartridge has been inserted.

In one exemplary embodiment, the system comprises a yoga ball 100, a motion sensor 300 connected to the yoga ball 100, a signal translating device in connectivity with a game console where the translating device is adapted to receive a signal from the motion sensor 300 where the signal comprises information regarding the movement of the yoga ball 100, translate the signal into a different signal that is recognized by the game console 400, and sends the translated signal to the game console 400.

Figure 9:
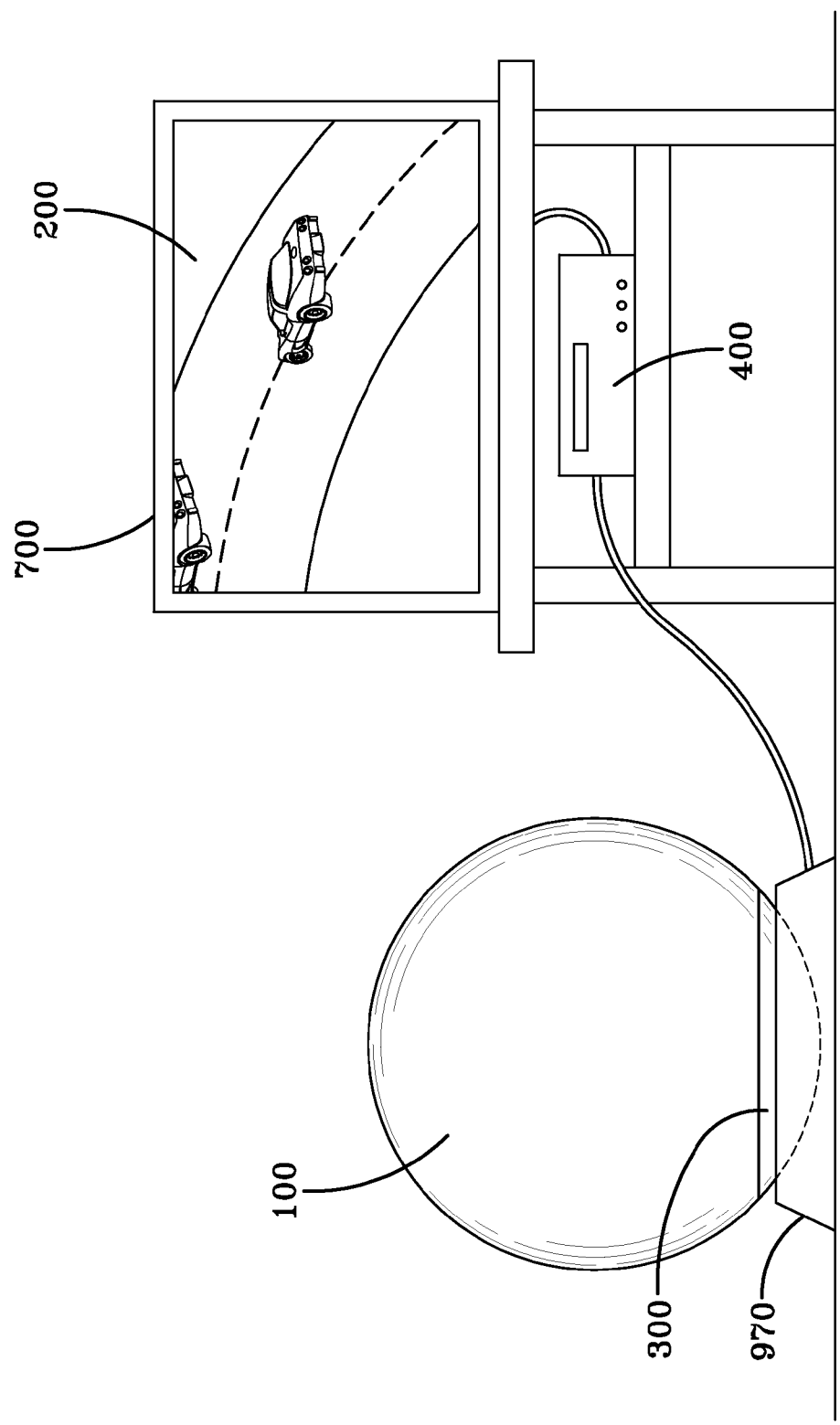
FIG. 9 shows an exemplary embodiment of a yoga ball stand that may be utilized to measure the motion of a yoga ball to progress an individual player through a video game.

As shown in FIG. 9, one exemplary embodiment comprises a yoga ball 100, a game console 400, a yoga ball stand 970 holding the yoga ball 100 in a desired position where the yoga ball stand 970 comprises a motion sensor 300 in communication with the game console 400, and a video game 200 executing on the console 400. In the exemplary embodiment, the motion sensor 300 of the yoga ball stand 970 may be able to sense the motion of the yoga ball 100 as it is utilized by an individual. In response to sensing the motion, the motion sensor 300 may send a message to the game console to progress the individual in the video game. In another exemplary embodiment, the system comprises a yoga ball comprising a motion sensor, a yoga ball stand 970 capable of holding the yoga ball 100 in a desired position, a video game console 400 in communication with the motion sensor 300, and a video game 200 executing on the game console 400.

While certain embodiments of the present invention are described in detail above, the scope of the invention is not to be considered limited by such disclosure, and modifications are possible without departing from the spirit of the invention as evidenced by the claims. For example, various configurations of the yoga ball, sensors, and other computer components may be implemented and fall within the scope of the claimed invention. The types of games that may be used in connection with the claimed in invention are numerous. Various hardware and software features and functionality may be varied and fall within the scope of the claimed invention. One skilled in the art would recognize that such modifications are possible without departing from the scope of the claimed invention.

The invention claimed is:

1. A computerized system for playing a video game comprising:
   (a) a yoga ball;
   (b) a handheld controller that generates signals as the yoga ball moves from a first ground position to a second ground position wherein the signals relate to the yoga ball's ground position change;
   (c) a holster on the yoga ball for holding the handheld controller; and
   (d) a game console in communication with the handheld controller that executes video game software causing progression of play in a video game in response to receiving signals from the handheld controller relating to a change in the yoga ball's ground position.

2. The system of claim 1 where the handheld controller comprises an accelerometer system that measures motion in three directions.

3. The system of claim 2 further comprising:
   (e) a display screen in communication with the game console.

4. The system of claim 1 further comprising a motion sensing mat for detecting changes in the yoga ball's ground position.

5. The system of claim 1 wherein the controller and game console are in communication via wireless technology.

6. A computerized system for playing a video game comprising:
   (a) a yoga ball comprising a motion sensor wherein the motion sensor detects changes between the yoga ball's current ground position and a neutral ground position and generates a signal relating to the yoga ball's ground position change; and
   (b) a game console in communication with the motion sensor wherein the game console executes video game software that receives the signals from the motion sensor and in response to receiving the signals, advances play toward an end result in a video game.

7. The system of claim 6 wherein the motion sensor detects additional changes in the yoga ball's ground position and the game console advances play in response to changes in the yoga ball's ground position.

8. The system of claim 6 further comprising:
   (c) a handheld controller that generates signals as the yoga ball moves from a first ground position to a second ground position, wherein the signals relate to the yoga ball's ground position change and are communicated to the game console.

9. The system of claim 6 wherein the motion sensor and game console communicate wirelessly.

10. The system of claim 8 wherein the yoga ball further comprises a holster for holding the handheld controller.

11. A computerized method for playing a video game comprising:
    (a) receiving at a game console from a yoga ball comprising a motion sensor a signal generated as the yoga ball moves from a neutral ground position to a new ground position in response to a user's motion; and
    (b) in response to receiving said signal at said game console, advancing progression toward a desired result in a video game executing on said game console.

12. The method of claim 11 wherein said motion sensor and game console are in communication via wireless technology.

13. The method of claim 11 wherein said signal generated as the yoga ball moves on the ground in response to a user's motion comprises a signal related to motion of a limb of said user.

14. The method of claim 11 wherein said motion sensor detects movement of said user's limb from a detectable band around said limb.

15. A computerized method for playing a video game comprising:
    (a) receiving at a game console from a yoga ball in communication with a handheld controller a signal generated as said yoga ball moves from a neutral ground position to a new ground position in response to a user's motion; and (b) in response to receiving said signal at said game console, generating a video effect in a video game executing on said game console wherein said video effect relates to progression in play toward a desired result in said video game.

16. The method of claim 15 wherein said handheld controller and game console are in communication via wireless technology.

17. The method of claim 15 wherein said handheld controller comprises an accelerometer to measure movements of the user as the yoga ball moves on the ground.

18. The method of claim 15 wherein said yoga comprises a harness for holding said controller.

19. The method of claim 18 wherein said harness is positioned on said user.

* * * * *